(12) United States Patent
Chen et al.

(10) Patent No.: US 11,588,538 B2
(45) Date of Patent: Feb. 21, 2023

(54) POSITIONING BEAM INFORMATION OBTAINING METHOD AND APPARATUS

(71) Applicant: HUAWEI TECHNOLOGIES CO., LTD., Shenzhen (CN)

(72) Inventors: Lei Chen, Beijing (CN); Lei Chen, Chengdu (CN); Su Huang, Shanghai (CN); Zhenyu Shi, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/396,145

(22) Filed: Aug. 6, 2021

(65) Prior Publication Data

US 2021/0367657 A1 Nov. 25, 2021

Related U.S. Application Data

(63) Continuation of application No. PCT/CN2020/070364, filed on Jan. 4, 2020.

(30) Foreign Application Priority Data

Feb. 13, 2019 (CN) .......................... 201910115293.0

(51) Int. Cl.
*H04J 13/00* (2011.01)
*H04B 7/08* (2006.01)
(Continued)

(52) U.S. Cl.
CPC ........... *H04B 7/086* (2013.01); *H04B 17/318* (2015.01); *H04L 5/0023* (2013.01); *H04W 72/042* (2013.01); *H04J 13/0062* (2013.01)

(58) Field of Classification Search
CPC .... H04B 7/0617; H04B 7/0695; H04B 7/088; H04B 7/04; H04B 17/318; H04B 17/309;
(Continued)

(56) References Cited

U.S. PATENT DOCUMENTS 10,004,057 B2 * 6/2018 Chae ................... H04W 64/006
11,375,340 B2 * 6/2022 Kim ......................... G01S 5/10
(Continued)

FOREIGN PATENT DOCUMENTS

CN 108307413 A 7/2018
CN 108702726 A 10/2018
(Continued)

OTHER PUBLICATIONS

ZTE, Enhance E-CID positioning with SSB information. 3GPP TSG-RAN WG2 #104, Spokane, USA, Nov. 12-16, 2018, R2-1816510, 4 pages.
(Continued)

*Primary Examiner* — Eva Y Puente
(74) *Attorney, Agent, or Firm* — Hauptman Ham, LLP

(57) ABSTRACT

This application provides a beam information obtaining method and an apparatus, relates to the field of communications technologies, and resolves a problem that resources of positioning reference signals are wasted because the positioning reference signals need to be omnidirectionally sent because of an unknown direction, of a terminal, caused by use of a beam, when the terminal is positioned in, e.g., a 5G system. The method in this application resolves the problem and saves overheads of sending a reference signal. The method includes: The terminal receives a beam information request sent by a location management device, where the beam information request is used to request the terminal to provide measurement information of a downlink beam. The terminal obtains beam information, where the beam information includes information about a reference signal that is sent by at least one network device and that is measured by the terminal.

19 Claims, 8 Drawing Sheets

(51) Int. Cl.
  *H04B 17/318* (2015.01)
  *H04L 5/00* (2006.01)
  *H04W 72/04* (2023.01)

(58) Field of Classification Search
  CPC .. H04B 7/0413; H04B 7/0417; H04B 7/0626;
        H04W 64/00; H04W 16/28; H04W 24/10;
        H04W 64/006; H04W 4/029; H04W
        64/003; H04W 72/046; H04W 72/048;
        H04L 5/0048; H04L 5/0023; H04L
        5/0007; H04L 5/0051; H04L 5/0094;
        H04L 5/0053; H04L 5/0091; H04L
        5/0058; H04J 13/0062; H04J 11/0079;
        H04J 13/0003; H04J 11/0069; H04J
        11/005; H04J 11/0073; H04J 11/0076;
        H04J 11/00
  USPC .......................................................... 375/262
  See application file for complete search history.

(56) References Cited

U.S. PATENT DOCUMENTS

| | | |
|---|---|---|
| 2017/0366244 A1 | 12/2017 | Lee et al. |
| 2018/0139763 A1 | 5/2018 | Bitra et al. |
| 2019/0037338 A1 | 1/2019 | Edge et al. |
| 2020/0119875 A1* | 4/2020 | John Wilson .......... H04B 7/088 |
| 2020/0145977 A1* | 5/2020 | Kumar .................. H04L 5/0048 |

FOREIGN PATENT DOCUMENTS

| | | |
|---|---|---|
| CN | 109314945 A | 2/2019 |
| EP | 2797347 A1 | 10/2014 |
| WO | 2017164925 A1 | 9/2017 |
| WO | 2018069208 A1 | 4/2018 |
| WO | 2018159967 A1 | 9/2018 |

OTHER PUBLICATIONS

Qualcomm Incorporated, On Demand Transmission of PRS for NR. 3GPP TSG-RAN WG2 Meeting #104, Spokane, USA, Nov. 12-16, 2018, R2-1817902, 27 pages.
Fraunhofer IIS, Fraunhofer HHI, NR beam management supporting multi-gNB measurements for positioning. 3GPP TSG RAN WG1 Meeting #95, Spokane, US, Nov. 12-16, 2018, R1-1813583, 8 pages.
Chinese Office Action issued in corresponding Chinese Application No. 201910115293.0, dated Mar. 24, 2021, pp. 1-8.
International Search Report issued in corresponding International Application No. PCT/CN2020/070364, dated Mar. 27, 2020, pp. 1-9.
CATT: "NR RAT-dependent DL Positioning",3GPP Draft; R1-1900310,Jan. 12, 2019, XP051575919,total 19 pages.
European Search Report issued in corresponding European Application No. 20756695.1, dated Jan. 27, 2022, pp. 1-21.
CATT, NR RAT-dependent DL Positioning[online], 3GPP TSG RAN WG1 adhoc_NR_AH_1901 R1-1900310, Jan. 12, 2019,total 25 pages.
Japanese Office Action issued in corresponding Japanese Application No. 2021-547245, dated Sep. 20, 2022, pp. 1-8.

* cited by examiner

POSITIONING BEAM INFORMATION OBTAINING METHOD AND APPARATUS

CROSS-REFERENCE TO RELATED APPLICATIONS

This application is a continuation of International Application No. PCT/CN2020/070364, filed on Jan. 4, 2020, which claims priority to Chinese Patent Application No. 201910115293.0, filed on Feb. 13, 2019. The disclosures of the aforementioned applications are hereby incorporated by reference in their entireties.

TECHNICAL FIELD

The present disclosure relates to the field of positioning in a wireless communications system, and in particular, to a positioning beam information obtaining method and an apparatus.

BACKGROUND

With continuous development of communications technologies, communication between a terminal and a network node has become a common type of communication between devices. It becomes increasingly important for a network node to position a terminal or for a terminal to request a positioning service to implement a specific application. In new radio (NR) in fifth generation mobile communications (5G), beam-based wireless communication is used to improve efficiency of communication on a frequency spectrum with a higher frequency. In other approaches, positioning includes a plurality of positioning methods. For example, an observed time difference of arrival (OTDOA) method is a cellular network-based positioning technology. User equipment (UE) receives a positioning reference signal (PRS) sent by each transmission point (TP), and calculates a time difference of arrival of PRSs sent by different transmission points. A location of the UE may be obtained by using a known geographical location of each PRS transmission point.

In the OTDOA, different transmission points sending PRSs are positioning base stations. In LTE, because a system operates at a low frequency, a PRS is omnidirectionally sent. A TP omnidirectionally sends a PRS on all PRS sending occasions.

Compared with that in LTE, a system operates on a higher spectrum in NR. To resist fading, a signal of an NR base station is transmitted based on beamforming, and a cell is covered by using a plurality of beams. A width and a quantity of required beams vary with an operating frequency. Therefore, in NR, a PRS also needs to be sent in a form of a beam.

PRS sending by using a beam has relatively great impact on a positioning system, and consequently how to improve PRS sending efficiency is a problem that needs to be studied in a 5G positioning system.

SUMMARY

Embodiments of this application provide a positioning beam information obtaining method and an apparatus, to resolve a problem of excessively high resource overheads caused by sending of positioning reference signals in all areas due to beamforming in a positioning system To achieve the foregoing objective, the following technical solutions are used in some embodiments of this application.

According to a first aspect, a positioning beam information obtaining method is provided, including: A terminal receives a beam information request sent by a location management function, where the beam information request is used to request the terminal to provide measurement information of a downlink beam. The terminal obtains beam information, where the beam information includes information about a reference signal that is sent by at least one first network device and that is measured by the terminal. The terminal sends the obtained beam information to the location management function. In the foregoing technical solution, the information about the reference signal measured by the terminal is obtained to obtain a direction of the reference signal that can be measured by the terminal, and a sending direction of a PRS is determined based on the direction of the reference signal, to avoid a resource waste caused by sending of PRSs in all directions.

In a possible implementation of the first aspect, the beam information request includes at least one of the following information: an identifier of a target transmission point, frequency band information, bandwidth information, and a waveform parameter. In the foregoing technical solution, the terminal can provide the beam information based on a requirement of the location management function by using the beam information request, so that the location management function can configure an appropriate beam for a base station or a location management unit, thereby reducing overheads.

In a possible implementation of the first aspect, the method further includes: The terminal sends a measurement request to a serving base station, where the measurement request is used to request to measure the reference signal sent by the at least one first network device, the measurement request includes at least one of the following information: the identifier of the target transmission point, the frequency band information, the bandwidth information, the waveform parameter, and a measurement type indication, and the measurement type indication is used to indicate the base station to configure beam information measurement for the terminal. In the foregoing technical solution, the terminal can obtain currently valid beam information by using the measurement request, thereby avoiding a problem that beam information is inaccurate because the beam information in the terminal exists for an excessively long time.

In a possible implementation of the first aspect, the method further includes: The terminal receives a measurement configuration sent by the serving base station, where the configuration includes information about a measurement object. The terminal performs measurement based on the measurement configuration. In the foregoing technical solution, the terminal obtains a measurement configuration parameter through the measurement configuration, so that beam measurement can be implemented to obtain the beam information.

In a possible implementation of the first aspect, the method further includes: The terminal receives an assistance data providing message sent by the location management function, where the assistance data providing message includes the beam information, and the beam information includes at least one of a beam type, a number, and a QCL indication. The terminal determines, based on the beam information, a direction of a beam for receiving the positioning reference signal. In the foregoing technical solution, the terminal obtains, through the assistance data providing message, a direction of a receive beam for positioning measurement, thereby avoiding a resource waste caused by sending of excessive positioning reference signals because of scanning and receiving performed by the terminal in all directions.

According to a second aspect, a positioning reference signal configuration method is provided. The method is applied to a positioning system, and includes: A first network device receives a positioning reference signal configuration request sent by a location management function, where the positioning reference signal configuration request includes beam information of a terminal. The first network device sends a positioning reference signal configuration response to the location management function, where the positioning reference signal configuration response includes configuration information of a positioning reference signal. In the foregoing technical solution, the beam information in the positioning reference signal configuration request indicates a sending direction of the positioning reference signal to the first network device, and the first network device configures a resource for the positioning reference signal based on the beam information, thereby avoiding a resource waste caused by sending of excessive positioning reference signals.

In a possible implementation of the second aspect, the method further includes: The first network device receives a beam information request sent by the location management function, where the beam information request is used to request measurement information of a downlink beam of the terminal, and the beam information request includes an identifier of a target transmission point. The first network device obtains the beam information of the terminal. In the foregoing technical solution, the beam information of the terminal is obtained by using the beam information request and the beam measurement information, so that a reference for configuration of the positioning reference signal is provided. This reduces occurrence of a problem that positioning reference signals need to be omnidirectionally sent because a beam that can be received by the terminal is unknown.

In a possible implementation of the second aspect, the method further includes: The first network device sends a beam information report to the location management function, where the beam information report includes at least one of the following information: an identifier of the terminal, the identifier of the target transmission point, a beam type of the target transmission point, a beam change, and a reference signal received power (RSRP) value of a beam. In the foregoing technical solution, the beam information of the terminal is notified to the location management function by using the beam information report, so that the location management function can configure an appropriate positioning reference signal for the first network device, thereby reducing overheads for sending the positioning reference signal.

In a possible implementation of the second aspect, that the first network device obtains the beam information of the terminal includes: The first network device determines the beam information of the terminal based on a historical measurement result reported by the terminal. Alternatively, the first network device performs measurement configuration for the terminal, and receives a measurement report sent by the terminal based on the measurement configuration, and the first network device determines the beam information of the terminal based on the measurement report. In the foregoing technical solution, the first network device obtains valid beam information based on different cases, to avoid a waste of positioning reference signal sending resources caused by invalid obtained beam information.

In a possible implementation of the second aspect, the method further includes: The first network device determines a configuration of the positioning reference signal based on the beam information, where the configuration of the positioning reference signal includes a frequency domain position, a time domain position, and a sending direction. The first network device sends the configuration of the positioning reference signal to the location management function. In the foregoing technical solution, the positioning reference signal is configured by using the beam information, so that the PRS is configured in a limited direction, thereby reducing PRS resource consumption.

In a possible implementation of the second aspect, the method further includes: The first network device receives a positioning reference signal configuration coordination result sent by the location management function, where the positioning reference signal configuration coordination result includes the configuration that is of the positioning reference signal and that is determined after interference coordination. In the foregoing technical solution, a positioning reference signal configuration coordination process is used to avoid mutual interference caused by a conflict between reference signals sent by a plurality of base stations or location management units.

According to another aspect of this application, a terminal is provided. The terminal is configured to implement a function of the beam information obtaining method according to any one of the first aspect or the possible implementations. The function may be implemented by hardware, or may be implemented by hardware by executing corresponding software. The hardware or the software includes one or more units corresponding to the foregoing function.

In a possible implementation, a structure of the terminal includes a processor. The processor is configured to support the terminal in performing the beam information obtaining method according to any one of the first aspect or the possible implementations of the first aspect. Optionally, the terminal may further include a memory and/or a communications interface. The memory stores code and data, the memory is coupled to the processor, and the communications interface is coupled to the processor or the memory.

According to another aspect of this application, a network node is provided. The network node is configured to implement a function of the positioning reference signal configuration method according to any one of the second aspect or the possible implementations of the second aspect. The function may be implemented by hardware, or may be implemented by hardware by executing corresponding software. The hardware or the software includes one or more units corresponding to the foregoing function.

In a possible implementation, a structure of the network node includes a processor. The processor is configured to support the network node in performing the function of the positioning reference signal configuration method according to any one of the second aspect or the possible implementations of the second aspect. Optionally, the network node may further include a memory and/or a communications interface. The memory stores code required for the processor and/or a baseband processor, the memory is coupled to the processor, and the communications interface is coupled to the memory or the processor.

According to another aspect of this application, a non-transitory computer-readable storage medium is provided. The non-transitory computer-readable storage medium stores instructions. When the instructions are run on a computer, the computer is enabled to perform the beam information obtaining method according to any one of the first aspect or the possible implementations of the first aspect, or perform the positioning reference signal configuration method according to any one of the second aspect or the possible implementations of the second aspect.

According to another aspect of this application, a computer program product including instructions is provided. When the computer program product runs on a computer, the computer is enabled to perform the beam information obtaining method according to any one of the first aspect or the possible implementations of the first aspect, or perform the positioning reference signal configuration method according to any one of the second aspect or the possible implementations of the second aspect.

According to another aspect of this application, a communications system is provided. The communications system includes a plurality of devices, and the plurality of devices include a terminal and a network node. The terminal is the terminal provided in the foregoing aspects, and is configured to perform the beam information obtaining method according to any one of the first aspect or the possible implementations of the first aspect; and/or the network node is the network node provided in the foregoing aspects, and is configured to perform the positioning reference signal configuration method according to any one of the second aspect or the possible implementations of the second aspect.

According to another aspect of this application, an apparatus is provided. The apparatus is a processor, an integrated circuit, or a chip, and is configured to perform the steps performed by the processing unit of the terminal in some embodiments of the present disclosure, for example, obtain beam information, perform measurement based on a measurement configuration, and determine, based on the beam information, a direction of a beam for receiving a positioning reference signal. The apparatus is further configured to perform processing or an action of the terminal that has been described in the foregoing aspects or embodiments. Details are not described herein again.

According to another aspect of this application, another apparatus is provided. The apparatus is a processor, an integrated circuit, or a chip, and is configured to perform steps performed by the processing unit of the network node in some embodiments of the present disclosure, for example, obtain beam information of a terminal, determine beam information of a terminal based on a measurement result reported by the terminal, perform measurement configuration for a terminal, or determine beam information of a terminal based on a measurement report. The another apparatus is further configured to perform processing or an action of the network node that has been described in the foregoing aspects or embodiments. Details are not described herein again.

It may be understood that the apparatus, the non-transitory computer storage medium, or the computer program product of the foregoing method for positioning beam information obtaining method is configured to perform a corresponding method provided above. Therefore, for beneficial effects that can be achieved by the apparatus, the non-transitory computer storage medium, or the computer program product, refer to the beneficial effects of the corresponding method provided above. Details are not described herein again.

DESCRIPTION OF EMBODIMENTS

The following describes the technical solutions in some embodiments of the present disclosure with reference to the accompanying drawings in some embodiments of the present disclosure. Clearly, the described embodiments are merely some rather than all of some embodiments of the present disclosure. All other embodiments obtained by a person skilled in the art based on some embodiments of the present disclosure without creative efforts shall fall within the protection scope of the present disclosure.

It should be understood that names of all nodes and messages in this application are merely names specified for ease of description in this application, and may be different names in an actual network. It should not be understood that names of various nodes and messages are limited in this application. On the contrary, any name that has a same or similar function as that of a node or a message used in this application is considered as that in a method or an equivalent replacement in this application, and is within the protection scope of this application. Details are not described below.

Figure 1:
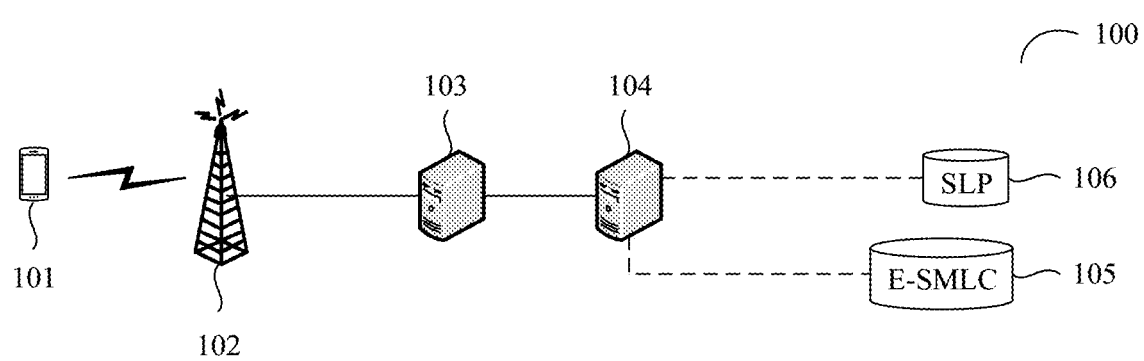
FIG. 1 is a schematic diagram of a positioning system according to an embodiment of the present disclosure.

To better understand a positioning beam information obtaining method and an apparatus that are disclosed in some embodiments of the present disclosure, the following first describes a network architecture used in some embodiments of the present disclosure. FIG. 1 is a schematic structural diagram of a communications system to which an embodiment of this application is applicable.

It should be noted that the communications system mentioned in this application includes but is not limited to a narrowband internet of things (NB-IoT) system, a wireless local area network (WLAN) system, an LTE system, a next-generation 5G mobile communications system, or a communications system after 5G, for example, an NR system, or a device-to-device (D2D) communications system.

In the communications system shown in FIG. 1, an architecture of a positioning system 100 is provided. The positioning system 100 includes at least a target device 101, a base station (BS) 102, an access management function (AMF) 103, and a location management function (LMF, also referred to as location management device) 104. The positioning system 100 may further include an enhanced serving mobile management center (E-SMLC) and a secure user plane location (SUPL) location platform (SLP) 106. The SLP 106 is configured to perform user plane positioning, and the E-SMLC 105 is configured to perform control plane positioning. The base station 102 includes a 5G base station and/or a next-generation LTE base station.

The target device 101 in the positioning system includes but is not limited to any one of user equipment (UE), a mobile station, an access terminal, a subscriber unit, a subscriber station, a mobile station, a remote station, a remote terminal, a mobile device, a terminal, a wireless communications device, a user agent, a station (ST) in a wireless local area network (WLAN), a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a mobile station in a 5G network, a terminal device in a future evolved public land mobile network (PLMN) network, and the like. The target device may also be referred to as a terminal device or a terminal. Details are not described below.

The positioning system 100 may include a plurality of base stations 102, including a serving base station and a neighboring base station, where the neighboring base station is a base station neighboring to the serving base station. The base station 102 includes but is not limited to an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), an eLTE (eLTE) base station, an NR base station (gNB), and the like.

In the positioning system 100, message transmission between the target device 101 and/or the base station 102 and the LMF is performed by using an LTE positioning protocol (LPP). However, in the 5G positioning system, the positioning protocol may be an NR positioning protocol (NRPP). The positioning protocol in this application may be an LPP, or may be an NRPP. This is not limited in this application. It should be understood that a positioning protocol used in this application is merely an example, and may be any one of an LPP or an NRPP. Details are not described below again.

In the following, UE is mainly used to represent a target terminal, and the target terminal is also referred to as a terminal. In addition, a positioning reference signal may be sent by a base station or a location management unit (LMU). For ease of description, the following uses the base station as an example in this application. However, it should be understood that the positioning reference signal is not limited to be sent by the base station, and may alternatively be sent by the LMU or another device. Details are not described again.

For ease of description, the following explains terms or concepts in some embodiments of this application.

A quasi-colocation (QCL) relationship is used to indicate that a plurality of resources have one or more same or similar communication features. For a plurality of resources that have a QCL relationship, a same or similar communications configuration may be used.

For example, if two antenna ports have a quasi-colocation relationship, a large-scale property of a channel used for one port to transmit a symbol may be inferred from a large-scale property of a channel used for the other port to transmit a symbol. The large-scale property may include a delay spread, an average delay, a Doppler spread, a Doppler frequency shift, an average gain, a receive parameter, a terminal receive beam number, a transmit/receive channel correlation, a receive angle of arrival (AOA), a receiver antenna spatial correlation, a dominant AOA, an average AOA, an AOA spread, and the like.

Specifically, a QCL may be specified by using a quasi-colocation indication, and that the quasi-colocation indication is used to indicate whether at least two groups of antenna ports have a quasi-colocation relationship includes: The quasi-colocation indication is used to indicate whether SCI-RSs sent by the at least two groups of antenna ports are from a same transmission point or beam group. A network node may notify a terminal that there is a QCL relationship between ports for sending RSs, to help the terminal receive and demodulate the RSs. For example, the terminal can acknowledge that there is a QCL relationship between a port A and a port B. To be specific, a large-scale parameter of an RS measured over the port A may be used for measurement and demodulation of an RS over the port B.

A spatial (spatial) QCL is a type of QCL, and "spatial" may be understood from a perspective of a transmit end or a receive end. From the perspective of a transmit end, if two antenna ports have a spatial QCL relationship, beam directions corresponding to the two antenna ports are the same in space. From the perspective of a receive end, if two antenna ports have a spatial QCL relationship, the receive end can receive, in a same beam direction, signals sent over the two antenna ports.

A signal in wireless communication needs to be received and sent through an antenna, and a plurality of antenna elements (antenna element) may be integrated on one panel (panel) to form an antenna panel. One radio frequency (RF) link may drive one or more antenna elements. The terminal and the network node may each include one or more antenna panels, and each antenna panel may include one or more beams. The antenna panel may be represented as an antenna array (antenna array) or an antenna subarray (antenna subarray). One antenna panel may include one or more antenna arrays/subarrays. One antenna panel may be controlled by one or more oscillators (oscillator). The RF link may be referred to as a receive channel and/or a transmit channel, a receiver branch (receiver branch), or the like. One antenna panel may be driven by one RF link, or may be driven by a plurality of RF links.

A beam is a communications resource that may be a wide beam, a narrow beam, or a beam of another type. A technology for forming a beam may be a beamforming technology, or may be another technology. The beamforming technology may be a digital beamforming technology, an analog beamforming technology, or a hybrid beamforming technology. Different beams may be considered as different resources. The terminal and the network node may send same or different information by using different beams.

A plurality of beams that have same or similar communication features may be considered as one beam. One beam may include one or more antenna ports, used to transmit a data channel, a control channel, a sounding signal, and the like. For example, a transmit beam may refer to distribution of signal strength formed in different directions in space after a signal is transmitted through an antenna, and a receive beam may refer to distribution of signal strength, in different directions in space, of a radio signal received from an antenna.

One or more antenna ports forming a beam may be considered as one antenna port set. In a protocol, a beam may further be embodied as a spatial filter (spatial filter). Beam information may be identified by using index information. The index information may correspond to an identifier of a resource configured for the terminal. For example, the index information may correspond to an identifier (ID) or a resource of a configured CSI-RS, or may correspond to an ID or a resource of a configured uplink SRS. Alternatively, the index information may be index information explicitly or implicitly carried by using a signal or a channel carried on a beam. For example, the index information may be index information that is of a beam and that is indicated by a synchronization signal (SS) or a PBCH sent on the beam.

A beam information identifier may include an absolute beam index, a relative beam index, a logical beam index, an index of an antenna port corresponding to a beam, an index of an antenna port group corresponding to a beam, a time index of a downlink SS block, beam pair link (BPL) information or a beam pair link index, a transmit parameter (Tx parameter) or index corresponding to a beam, a receive parameter (Rx parameter) or index corresponding to a beam, a transmit weight (weight) or index corresponding to a beam, a weight matrix (weight matrix), a weight vector (weight vector), a receive weight corresponding to a beam, a transmit codebook (codebook) or index corresponding to a beam, a receive codebook or index corresponding to a beam, and the like.

In LTE, for a current serving cell, a base station may enable the terminal to report reference signal resources that can be simultaneously measured, to help the base station transmit a plurality of reference signals. Because a reference signal, such as a cell-specific reference signal, in LTE, is transmitted through broadcasting, any terminal in a specific coverage range can receive the reference signal. The terminal reports reference signals that can be measured, so that a network can learn of the reference signals that can be simultaneously received by the terminal. Usually, the reference signals that can be measured by the terminal are in a relatively large angle domain. Therefore, the terminal can measure orthogonal or quasi-orthogonal reference signals from different network nodes or transmission nodes, to implement measurement.

However, in NR, because a beam is used, coverage is narrower than that of a reference signal. A beam sent by the network can be received only when a receive beam of the terminal is at a specific angle or within a specific range. Therefore, when the network sends a reference signal used for positioning to the terminal, if the network does not know a location of the terminal, the network needs to send reference signals used for positioning in all directions, so that the terminal can receive a reference signal at a moment, thereby implementing positioning measurement.

In this application, the reference signal used for positioning includes a reference signal that can be used for positioning measurement, and includes but is not limited to a CSI-RS, a tracking reference signal (TRS), a synchronization signal block (SSB), a DMRS, and a positioning reference signal (PRS). In this application, the positioning reference signal is used as an example for description. It should be understood that using the positioning reference signal does not mean that only the positioning reference signal can be used for positioning. Details are not described below.

If the network sends PRSs in all directions to implement terminal positioning, a great waste of resources is caused. This is because the terminal receives a PRS only in one direction.

Therefore, in a beam-based positioning method in NR, it is necessary to effectively send a positioning reference signal. Currently, a positioning procedure does not support beam information collection and effective PRS resource configuration. This application mainly resolves the foregoing problem.

To resolve the foregoing problem, a positioning beam information obtaining method is used in some embodiments, including: A terminal receives a beam information request sent by a location management function, where the beam information request is used to request a terminal to provide measurement information of a downlink beam. The terminal obtains beam information, where the beam information includes information about a reference signal that is sent by at least one first network device and that is measured by the terminal. The terminal sends the obtained beam information to the location management function.

The beam information request includes at least one of the following information: an identifier of a target transmission point, frequency band information, bandwidth information, and a waveform parameter.

The method further includes: The terminal sends a measurement request to a serving base station, where the measurement request is used to request the at least one first network device to send the reference signal for measurement by the terminal, and the measurement request includes at least one of the following information: the identifier of the target transmission point, the frequency band information, the bandwidth information, the waveform parameter, and a measurement type indication, and the measurement type indication is used to indicate the base station to configure beam information measurement for the terminal.

The method further includes: The terminal receives a measurement configuration sent by the serving base station, where the configuration includes information about a measurement object. The terminal performs measurement based on the measurement configuration.

The first network device may be a serving base station, or a neighboring base station, or a serving base station and at least one neighboring base station. The serving base station is a base station that currently establishes a connection to the terminal and provides a service for the terminal. The neighboring base station is a base station that can be detected by the terminal. Details are not described below.

Figure 2:
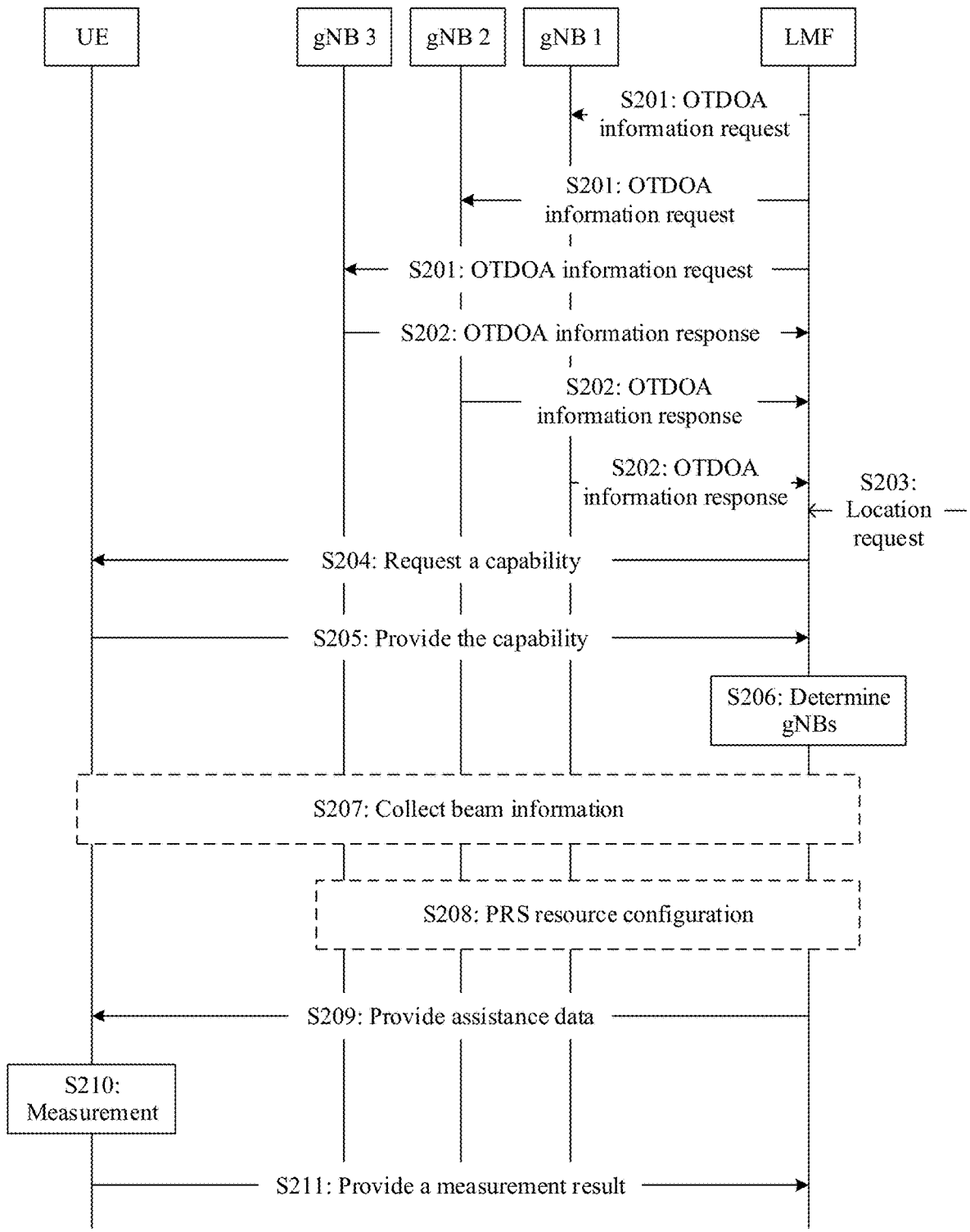
FIG. 2 is a beam information obtaining method according to an embodiment of the present disclosure.

FIG. 2 is a beam information obtaining method according to an embodiment of the present disclosure. It should be understood that, in FIG. 2, an OTDOA is used as an example, but this embodiment is not limited to the OTDOA. This embodiment is applicable to all downlink positioning methods. Herein, the OTDOA is used as an example only, but does not constitute a limitation on this embodiment of this application. Details are not described below again. The following steps are included.

S201: A location management function sends an information request to a first network device.

The first network device may include a plurality of base stations, such as a gNB 1, a gNB 2, and a gNB 3. One of the base stations is a serving base station. Specifically, using an OTDOA as an example, the information request is used to request assistance information used for the OTDOA from one or more base stations, and the assistance information includes: a PRS sending periodicity, an offset, a sending time length, and the like.

It should be understood that FIG. 2 shows a plurality of gNBs. In NR, because one base station may send a plurality of beams, OTDOA positioning may also be implemented through one base station. The plurality of base stations in FIG. 2 are merely an example.

S202: The base station sends an OTDOA information response to the LMF.

Each base station reports information, used for the OTDOA, of all sending sites within the base station to a positioning server. The information mainly includes an identifier of the base station, an identifier of a transmission point, and PRS configuration information, where the PRS configuration information includes: a PRS sending periodicity, an offset, a sending time length, and the like. Details are not described below again.

S203: A positioning request of UE arrives at the location management function, where the positioning request may be triggered by the UE, or may be triggered by a network side, and a specific network element that triggers the positioning request is not limited in this application.

S204: The location management function requests a capability from the UE.

The positioning server requests a positioning-related capability of the UE from the UE, where the positioning-related capability includes a UE-supported positioning method.

S205: The UE provides the capability for the LMF.

Similarly, the UE reports the positioning-related capability to the LMF, and the positioning-related capability includes the UE-supported positioning method.

S206: The LMF determines a gNB used for positioning.

The LMF determines, based on the OTDOA information response, the gNB that can be used to position the terminal, where the gNB may be one gNB or may be a plurality of gNBs. For example, gNBs that are selected to position the UE may be determined based on a gNB PRS resource. A specific implementation is not limited in this application.

It should be understood that the gNB herein is merely an example, the base station used for positioning is not limited in this application, and another base station may be used. Alternatively, a plurality of different base stations may be used to coordinately position the UE. Details are not described below again.

S207: The LMF collects beam information.

As described above, because the base station sends a PRS by using a beam, to avoid PRS transmission in an unnecessary direction, before performing PRS resource configuration, the base station and/or the LMF may first collect the beam information, to determine beams that can be received by the UE. Directions in which PRSs are to be sent are determined based on the beams that can be received by the UE.

In a possible implementation, step S207 may be implemented before S206. After the beam information is collected, the base station used for positioning is determined. The beam information is collected in advance, so that the LMF can better determine the base station used for positioning, and provide better positioning performance.

Specifically, the collection of the beam information may be completed with assistance of the base station or the UE. A specific implementation process is described in the following embodiments.

S208: The LMF and the base station perform the PRS resource configuration.

The first network device determines a configuration of a positioning reference signal based on the beam information, where the configuration of the positioning reference signal includes a frequency domain position, a time domain position, and a sending direction. The first network device sends the configuration of the positioning reference signal to the location management function.

The PRS resource configuration between the LMF and the base station is mainly PRS configuration in a specific direction. To implement the PRS resource configuration, the LMF needs to request the base station to perform the PRS configuration on a specific resource. A specific method is described in the following embodiments.

S209: The LMF sends an assistance data providing message to the UE.

The assistance data providing message includes information about a reference site and information about several neighboring sites, where the information includes an identifier of a corresponding site, a carrier frequency, and the PRS configuration information. The assistance data providing message may further include beam information for a TP, for example, at least one of a beam type, a number, and a QCL indication. The PRS configuration information includes at least one of a start time, a period, and duration of PRS sending, and a PRS generation parameter.

For example, in assistance data, for a TP, a beam type is an SSB, and a number is 3, indicating that there is a QCL relationship between a PRS sent by the TP and an SSB whose number is 3 and that is sent by the TP.

It should be noted that there may be one or more beam types and one or more numbers. This is not limited herein.

It should be understood that, in S209, the LMF provides information about a receive beam for the UE through the assistance data providing message. The UE may obtain, through the assistance data providing message, a direction of the receive beam for receiving the positioning reference signal. Alternatively, this step may not depend on the foregoing other steps, provided that the LMF can provide beam-related information.

S210: The UE performs PRS measurement.

The UE receives the PRS based on the assistance data in step S209 by using a receive beam corresponding to a beam that has a QCL relationship with the PRS, and calculates a PRS time difference of arrival.

The UE determines, based on the assistance data, a number of the beam that has the QCL relationship with the PRS, and receives the PRS by using a receive beam corresponding to a direction of a reference signal having a same number of the beam. PRSs of a plurality of base stations may be measured through the OTDOA. Therefore, the UE needs to first determine a beam that is of each base station and that has a QCL relationship with a PRS. After the beam that has the QCL relationship with the PRS is determined, a receive beam corresponding to the beam is used to receive the PRS.

It should be understood that the QCL relationship may be defined in a protocol. To be specific, a QCL relationship between a PRS in information provided by the assistance data and a beam corresponding to a beam number in the beam information is defined in the protocol. Therefore, the QCL indication does not need to be provided in the assistance data providing message.

S211: The UE provides a measurement result to the LMF.

The UE may obtain a measurement result of the PRS through the measurement in S210. For the OTDOA, a time difference between a plurality of reference signals is included. A specific reporting manner and format of the measurement result are not limited in this application.

According to the foregoing embodiment, the LMF may collect the beam information of the UE, and configure the positioning reference signal of the base station based on the collected beam information, so that positioning can be implemented only by sending a PRS in a specific direction, thereby reducing PRS sending overheads.

It should be understood that a sequence of the steps in the foregoing embodiment is not strictly limited. For example, step S207 may be performed before step S206, so that the LMF can better determine, based on the collected beam information, the base station used for positioning.

Figure 3:
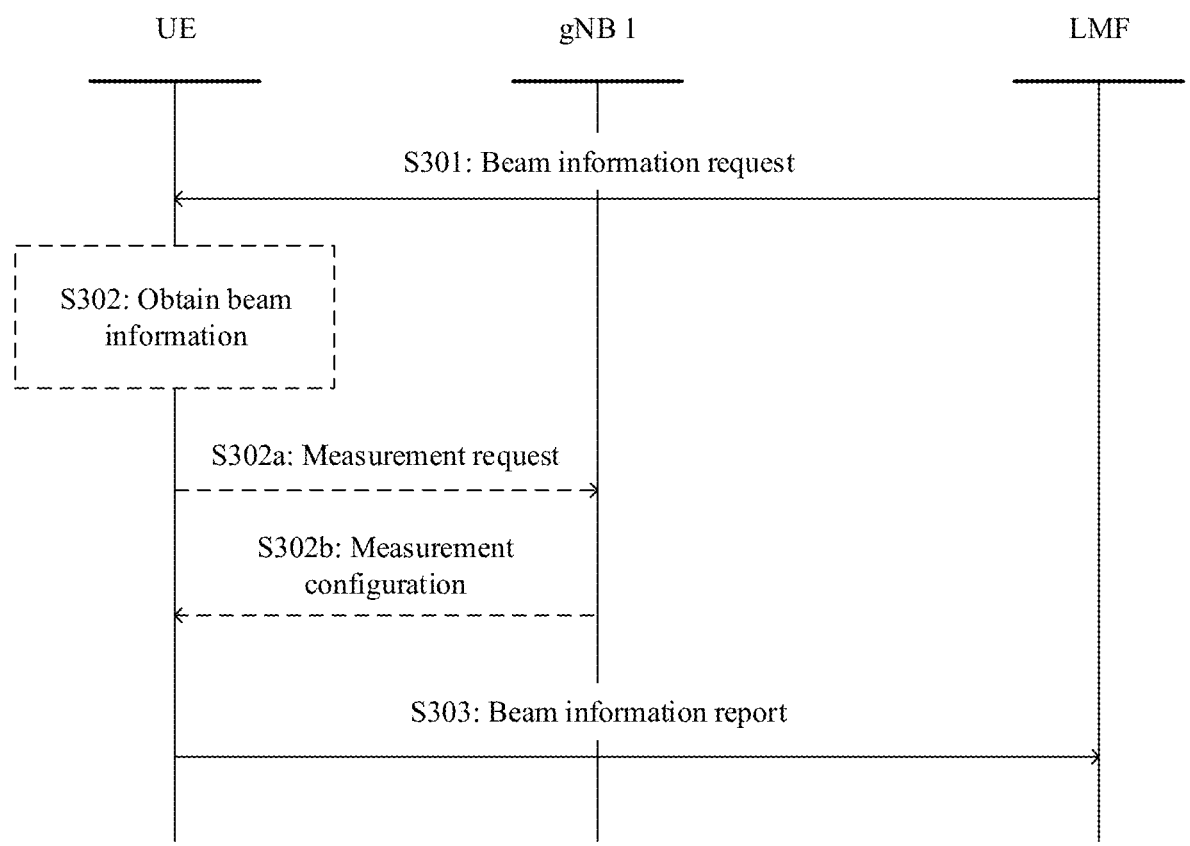
FIG. 3 is a flowchart of UE-assisted beam information collection according to an embodiment of the present disclosure.

FIG. 3 is a flowchart of UE-assisted beam information collection according to an embodiment of this application. FIG. 3 includes the following steps.

S301: An LMF sends a beam information request to UE.

The UE receives the beam information request sent by the location management function, where the beam information request is used to request the UE to provide measurement information of a downlink beam.

The beam information request includes at least one of the following information: an identifier of a target transmission point, frequency band information, bandwidth information, and a waveform parameter.

There may be a plurality of target transmission points. Therefore, identifiers of the plurality of target transmission points may be included.

In a possible implementation, because the LMF does not know a location of the UE, the LMF does not know a reference signal that is of a base station and that can be measured by the UE. Therefore, in the beam information request, only the UE is indicated to perform measurement, but an identifier of a target transmission point for which measurement needs to be performed is not specified.

S302: The UE obtains beam information.

Specifically, the UE determines whether there is measured beam information based on a historical measurement result. The UE performs step S303 if there is measured beam information. If there is no measured beam information, the UE determines whether a measurement GAP is required for measuring reference signals of target transmission points. S302a and S302b are performed if the measurement GAP is required. If the measurement GAP is not required, the UE measures a reference signal of a target transmission point on an available measurement opportunity, to obtain the beam information. Then, S303 is performed.

In a possible implementation, if the LMF specifies an identifier of a target transmission point in the beam information request, the UE determines whether there is a measurement result of the specified target transmission point. Step S303 is performed if there is a measurement result of the specified target transmission point. If there is no measurement result of the specified target transmission point, the UE determines whether a measurement GAP is required for measuring reference signals of target transmission points. S302a and S302b are performed if the measurement GAP is required. If the measurement GAP is not required, the UE measures a reference signal of a target transmission point on an available measurement opportunity, to obtain the beam information. Then, S303 is performed.

In a possible implementation, if the LMF specifies a minimum quantity of reported target transmission points in the beam information request, the UE determines whether there is a measurement result satisfying the minimum quantity of reported target transmission points. Step S303 is performed if there is a measurement result satisfying the minimum quantity of reported target transmission points. If there is no measurement result satisfying the minimum quantity of target transmission points that are reported, the UE determines whether a measurement GAP is required for measuring reference signals of target transmission points. S302a and S302b are performed if the measurement GAP is required. If the measurement GAP is not required, the UE measures a reference signal of a target transmission point on an available measurement opportunity, to obtain the beam information. Then, S303 is performed.

In a possible implementation, if the LMF specifies a minimum quantity of reported target transmission points and a reference signal measurement threshold in the beam information request, the UE determines whether there is a measurement result satisfying the reference signal measurement threshold and the minimum quantity of reported target transmission points. Step S303 is performed if there is a measurement result satisfying the reference signal measurement threshold and the minimum quantity of reported target transmission points. If there is no measurement result satisfying the reference signal measurement threshold and the minimum quantity of target transmission points that are reported, the UE determines whether a measurement GAP is required for measuring reference signals of target transmission points. S302a and S302b are performed if the measurement GAP is required. If the measurement GAP is not required, the UE measures a reference signal of a target transmission point on an available measurement opportunity, to obtain the beam information. Then, S303 is performed.

S302a: The UE sends a measurement request to a serving base station.

The measurement request is used to request at least one first network device to send a reference signal for measurement by the UE, and the measurement request includes at least one of the following information: the identifier of the target transmission point, the frequency band information, the bandwidth information, the waveform parameter, and a measurement type indication, and the measurement type indication is used to indicate the base station to configure beam information measurement for the UE.

In a possible implementation, the measurement request sent by the UE to the serving base station includes a minimum quantity of reported target transmission points, but does not specifically specify the identifier of the target transmission point. Usually, the serving base station may configure more base stations or reference signals for the UE to perform measurement.

It should be understood that the UE can send the measurement request only to the serving base station herein. If assistance information of a neighboring base station is required, the serving base station needs to interact with the neighboring base station, to instruct the neighboring base station to send a reference signal to assist the UE in performing measurement.

S302b: The serving base station sends a measurement configuration to the UE.

The measurement configuration sent by the serving base station to the UE is similar to a measurement configuration sent in a handover process, and details are not described again.

It should be understood that after receiving the measurement configuration, the UE completes measurement within a specified time window. A measurement object may be a reference signal of any type, or may be a reference signal of a target transmission point specified in the beam information request. The reference signal includes the foregoing reference signal used for positioning, such as an SSB or a CSI-RS. Details are not described again.

S303: The UE sends a beam information report to the LMF.

The beam information report includes at least one of an identifier of a transmission point, a beam type corresponding to the transmission point, a beam number, and a measured RSRP corresponding to the beam number.

According to the foregoing embodiment, the LMF may obtain, from the UE, information about beams that can be measured by the UE. The LMF may configure, by using the information about the beams, PRSs in directions of the beams, so that the UE can perform PRS measurement in the directions corresponding to the beams, thereby avoiding PRS sending in all directions. This reduces system overheads, and improves positioning efficiency.

Figure 4:
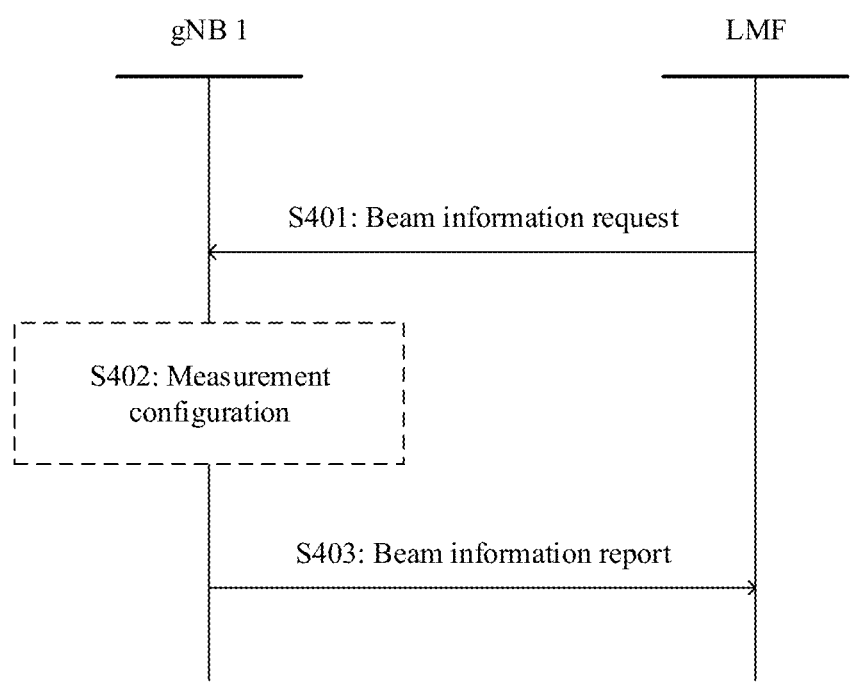
FIG. 4 is a flowchart of base station-assisted beam information collection according to an embodiment of the present disclosure.

FIG. 4 is a flowchart of base station-assisted beam information collection according to an embodiment of this application. FIG. 4 includes the following steps.

S401: An LMF sends a beam information request to a serving base station.

The beam information request includes an identifier of the UE. The identifier of the UE may be any identifier, for example, a cell radio network temporary identifier (C-RNTI). The identifier of the UE is not limited in this application.

After the serving base station receives the beam information request, a first network device (for example, the serving base station) determines beam information of the UE based on a historical measurement result reported by the UE. Alternatively, a first network device performs measurement configuration for the UE, and receives a measurement report sent by the UE based on the measurement configuration, and the first network device determines beam information of the UE based on the measurement report.

It should be understood that the historical measurement result means that when the beam information request is received, a time at which the first network device obtains a historical measurement result is less than a predetermined time. In other words, the historical measurement result can ensure that the beam information of the UE is valid, and can reflect a measurement result of receiving the beam information by the UE.

S402: The serving base station performs measurement configuration.

Step S402 is optional. Specifically, the serving base station determines whether there is a measurement result of the beam information of the UE, and whether the measurement result of the beam information does not exceed a specific time. Step S403 is directly performed if there is a measurement result of the beam information of the UE, and the measurement result of the beam information does not exceed a specific time. The serving base station performs the measurement configuration for the UE if there is a measurement result of the beam information of the UE, or the measurement result of the beam information exceeds a specific time. The LMF may request the serving base station to provide a measurement result of a specified target transmission point.

In a possible implementation, if the LMF specifies a minimum quantity of reported target transmission points in the beam information request, the serving base station determines whether there is a measurement result satisfying the minimum quantity of reported target transmission points. Step S403 is performed if there is a measurement result satisfying the minimum quantity of reported target transmission points. If there is no measurement result satisfying the minimum quantity of reported target transmission points, the serving base station performs measurement configuration for the UE and obtains a measurement result.

In a possible implementation, if the LMF specifies a minimum quantity of reported target transmission points and a reference signal measurement threshold in the beam information request, the serving base station determines whether there is a measurement result satisfying the reference signal measurement threshold and the minimum quantity of reported target transmission points. Step S403 is performed if there is a measurement result satisfying the reference signal measurement threshold and the minimum quantity of reported target transmission points. If there is no measurement result satisfying the minimum quantity of reported target transmission points, the serving base station performs measurement configuration for the UE and obtains a measurement result.

S403: The serving base station sends a beam information report to the LMF.

The serving base station sends the beam information report to a positioning server. The beam information report carries an ID of the UE, an identifier of a target transmission point, a beam type corresponding to the target transmission point, a beam number, and an RSRP value corresponding to a beam.

According to the embodiment shown in FIG. 3 or FIG. 4, the LMF may obtain the beam information of the UE, and perform PRS configuration based on the beam information, thereby avoiding a case in which a PRS scanning process needs to be performed in a positioning measurement process. This reduces system overheads, and improves a positioning speed.

It should be understood that the foregoing process is completed before positioning. Usually, the LMF needs to obtain the beam information of the UE in advance, to implement effective PRS configuration. The obtaining the beam information of the UE may be obtaining the beam information by using an existing measurement result or by performing measurement configuration on the UE.

Figure 5:
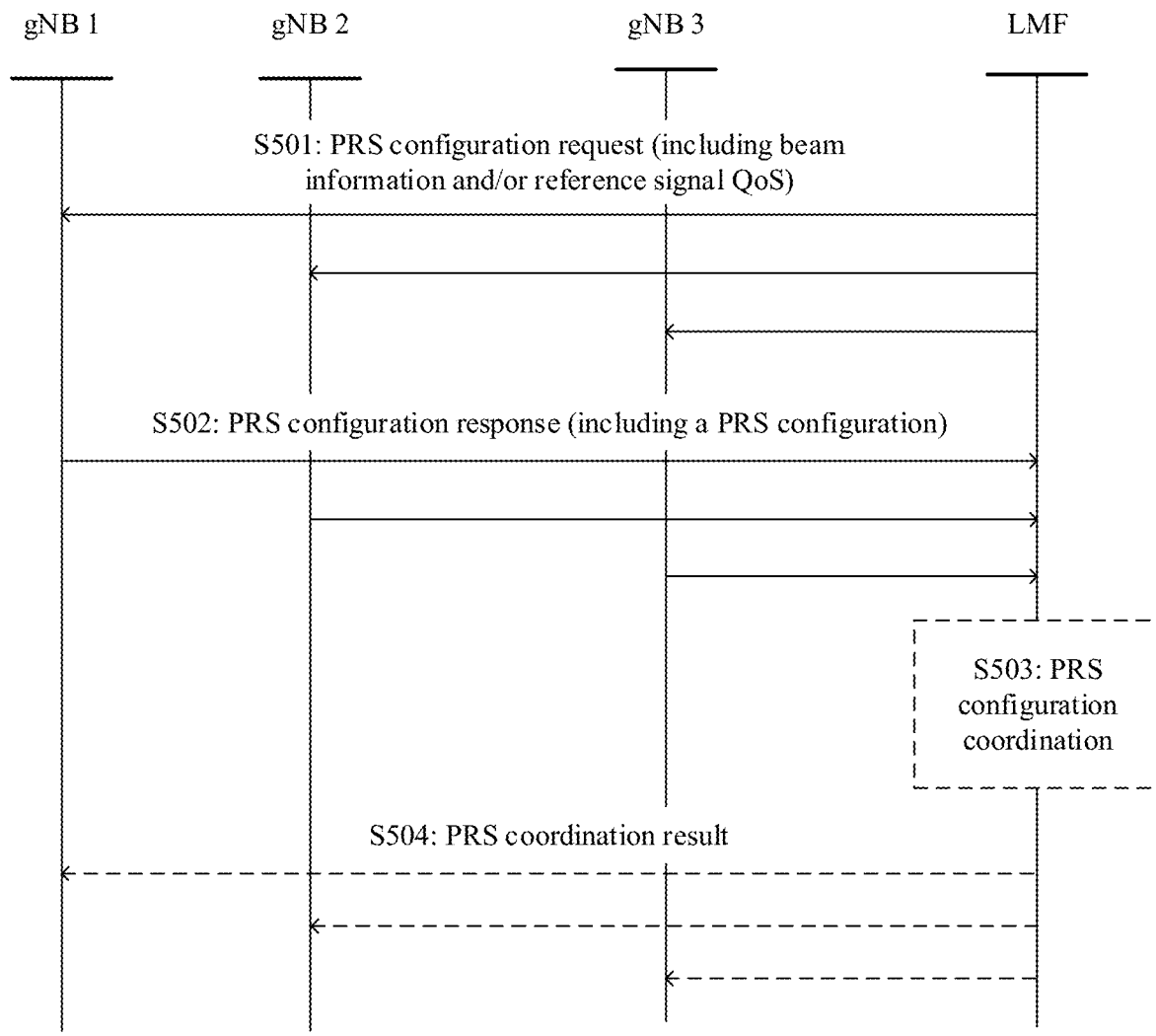
FIG. 5 is a flowchart of PRS resource configuration between an LMF and a base station according to an embodiment of the present disclosure.

FIG. 5 is a flowchart of PRS resource configuration between an LMF and a base station according to an embodiment of this application. The following steps are included.

S501: An LMF sends a positioning reference signal configuration request to a first network device.

The positioning reference signal configuration request includes beam information of a UE. The positioning reference signal configuration request further includes a positioning requirement, for example, a positioning delay, positioning precision, QoS information of a beam measured by the UE, a PRS periodicity, and bandwidth information, of a positioning service. The positioning reference signal configuration request further includes the beam information, of each target transmission point, collected in step S207, and a QCL sending indication.

The QCL sending indication is used to indicate the first network device to send a PRS in a specified beam direction. For example, if the positioning reference signal configuration request includes information about a beam, for example, an identifier of the beam, when performing PRS sending, a base station sends the PRS having a QCL relationship with the specified beam.

QoS information of a beam measured by the UE is used to indicate QoS of the beam measured by the UE. The first network device may determine, based on the QoS information, whether to accept the PRS configuration request. For example, when QoS of a beam measured by the UE is lower than a threshold, the first network device may not need to send a PRS in a direction of the beam. Alternatively, the first network device determines a PRS transmit power based on the QoS information, for example, increases or decreases a transmit power.

S502: The first network device returns a PRS configuration response.

The PRS configuration response includes a PRS configuration. The PRS configuration includes parameters such as a PRS sending frequency, a bandwidth, a subcarrier spacing, a periodicity, an offset, and a PRS occasion length, and may also carry a type and number of a beam, where the type and the number indicate that a transmission point is to send a PRS in a direction of the beam.

S503: The LMF performs PRS configuration coordination.

This step is optional. The LMF coordinates PRS configuration of each transmission point to avoid interference. Because the first network device may independently configure a PRS resource, when a resource conflict occurs, the LMF needs to perform coordination, to avoid mutual interference between PRSs configured by first network devices.

In a possible implementation, the LMF sends a PRS configuration request to a serving base station, and the serving base station coordinates PRS resources of all neighboring base stations. In this case, the PRS configuration request includes an identifier of each target transmission point, or the serving base station determines a target transmission point. After collecting PRS configurations of the neighboring base stations, the serving base station sends the PRS configurations of the base stations to the LMF in a unified manner. In this implementation, S504 is not required.

S504: The LMF sends a PRS coordination result to the first network device.

This step is also optional. If PRS coordination has been performed on a base station side, this step is skipped. The first network device receives a positioning reference signal configuration coordination result sent by the location management function, where the positioning reference signal configuration coordination result includes a configuration that is of a positioning reference signal and that is determined after interference coordination. The PRS coordination result may further include indication information, used to indicate different transmission points to send PRSs by using PRS configurations. The PRS configuration is the same as that described above and is not described again.

In the foregoing embodiment, the PRS configuration request and the PRS configuration response are used to indicate each first network device to transmit a PRS in a specified direction, and a PRS sending resource of the first network device is coordinated through interaction between the LMF and the first network device. This reduces a resource waste caused by PRS sending performed by the first network device in all directions because the first network device does not know a direction of the UE.

The foregoing mainly describes the solutions provided in some embodiments of this application from a perspective of interaction between network elements. It may be understood that, to implement the foregoing functions, the network elements, such as the UE and the network node, include corresponding hardware structures and/or software modules for performing the functions. A person skilled in the art should be easily aware that, in combination with the network elements and algorithm steps in the examples described in some embodiments disclosed in this specification, this application may be implemented by using hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In some embodiments of this application, each of the UE, the first network device, and the location management function may be divided into functional modules based on the foregoing method examples. For example, each of the UE, the first network device, and the location management function may be divided into functional modules, or two or more functions may be integrated into one processing module. The integrated module may be implemented in a form of hardware, or may be implemented in a form of a software functional module. It should be noted that, in some embodiments of this application, division into the modules is an example, and is merely logical function division. During actual implementation, another division manner may be used. It should also be understood that functional modules of the UE in this application do not include all functional modules of the UE, but include only functional modules related to this application. The first network device may be a base station or a location management unit.

Figure 6:
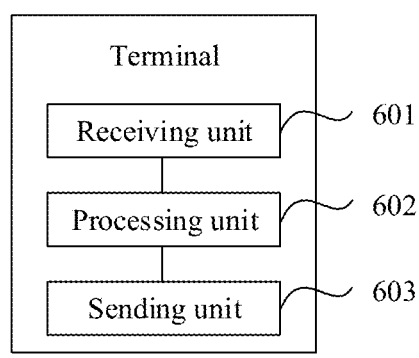
FIG. 6 is a possible schematic structural diagram of a terminal according to an embodiment of the present disclosure.

FIG. 6 is a possible schematic structural diagram of a terminal that is related to the foregoing embodiments and that is provided in this application. The terminal includes a receiving unit 601, a processing unit 602, and a sending unit 603. The receiving unit 601 is configured to support the terminal in performing S204, S207, and S209 in FIG. 2, and S301 and S302b in FIG. 3. The processing unit 602 is configured to support the terminal in performing S210 in FIG. 2 and processing a received or sent message, or performing S302 in FIG. 3 and processing a received or sent message. The sending unit 603 is configured to support the first node in performing S205, S207, and S211 in FIG. 2, and S302a and S303 in FIG. 3.

In terms of hardware implementation, the receiving unit 601 may be a receiver, the sending unit 603 may be a transmitter, and the receiver and the transmitter are integrated into a communications unit to form a communications interface.

Figure 7:
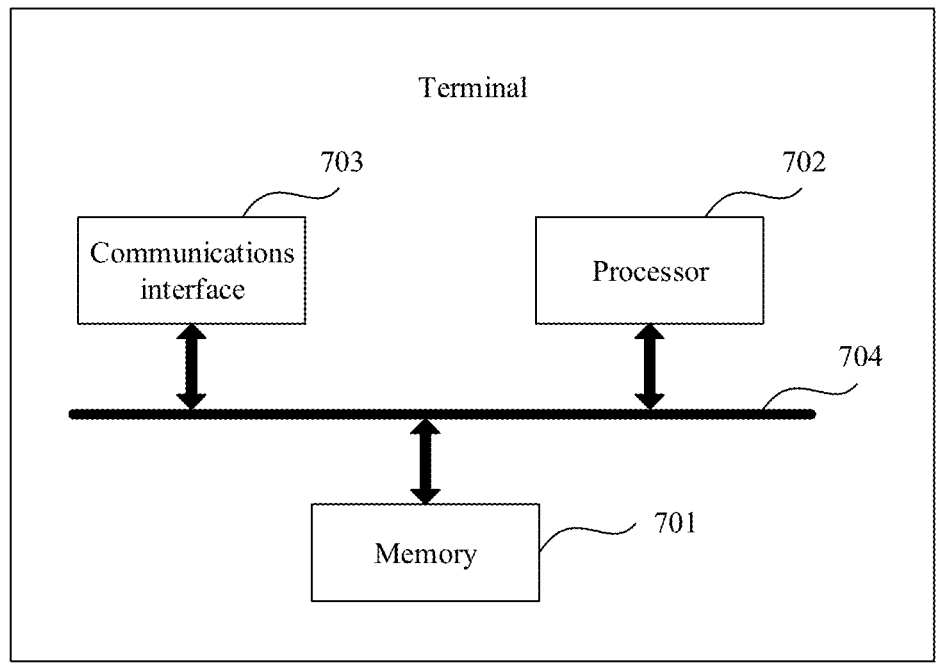
FIG. 7 is a possible schematic diagram of a logical structure of a terminal according to an embodiment of the present disclosure.

FIG. 7 is a schematic diagram of a possible logical structure of a terminal that is related to the foregoing embodiments and that is provided in an embodiment of this application. The terminal includes a processor 702. In this embodiment of this application, the processor 702 is configured to control and manage an action of the terminal. For example, the processor 702 is configured to support the terminal in performing S210 in FIG. 2 and processing a received or sent message, or performing S302 in FIG. 3 and processing a received or sent message in the foregoing embodiments. Optionally, the terminal may further include a memory 701 and/or a communications interface 703. The processor 702, the communications interface 703, and the memory 701 may be connected to each other or connected to each other by using a bus 704. The communications interface 703 is configured to support the terminal in performing communication, and the memory 701 is configured to store program code and data of the terminal. The processor 702 invokes the code stored in the memory 701 to perform control management. The memory 701 may be coupled to or not coupled to the processor.

The processor 702 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. The bus 704 may be a peripheral component interconnect (PCI) bus, an extended industry standard architecture (EISA) bus, or the like. The bus may be categorized as an address bus, a data bus, a control bus, and the like. For ease of representation, only one thick line is used to represent the bus in FIG. 7, but this does not mean that there is only one bus or only one type of bus.

The processor 702 and the memory 701 may also be integrated into an application-specific integrated circuit, and the application-specific integrated circuit may further include the communications interface 703. The application-specific integrated circuit may be a processing chip, or may be a processing circuit. The communications interface 703 may be a communications interface that includes wireless receiving and sending, or may be an interface of a digital signal that is input after a received radio signal is processed by another processing circuit, or may be a software or hardware interface that communicates with another module.

Figure 8:
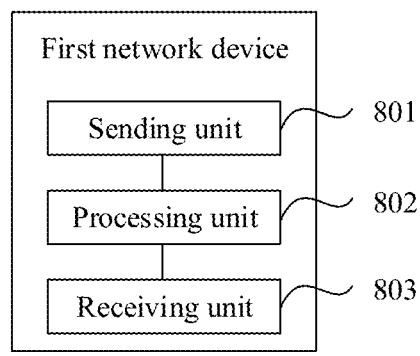
FIG. 8 is a possible schematic structural diagram of a first network device according to an embodiment of the present disclosure.

FIG. 8 is a possible schematic structural diagram of the first network device in the foregoing embodiments according to this application. In this application, the first network device is a base station or a location management unit, and the base station includes a serving base station and/or a neighboring-cell base station. The first network device includes a sending unit 801 and a receiving unit 803. The sending unit 801 is configured to support the first network device in performing S202, S207, and S208 in FIG. 2, S302*b* in FIG. 3, S403 in FIG. 4, and S502 in FIG. 5. The receiving unit 803 is configured to support the first network device in performing S201, S207, and S208 in FIG. 2, S302*a* in FIG. 3, S401 in FIG. 4, and S501 and S504 in FIG. 5.

The first network device may further include a processing unit 802 configured to support the first network device in performing S402 in FIG. 4, processing received and/or sent messages performed by the first network device in the foregoing method embodiments, obtaining beam information, and the like.

In terms of hardware implementation, the sending unit 801 may be a transmitter, the receiving unit 803 may be a receiver, and the receiver and the transmitter are integrated into a communications unit to form a communications interface.

Figure 9:
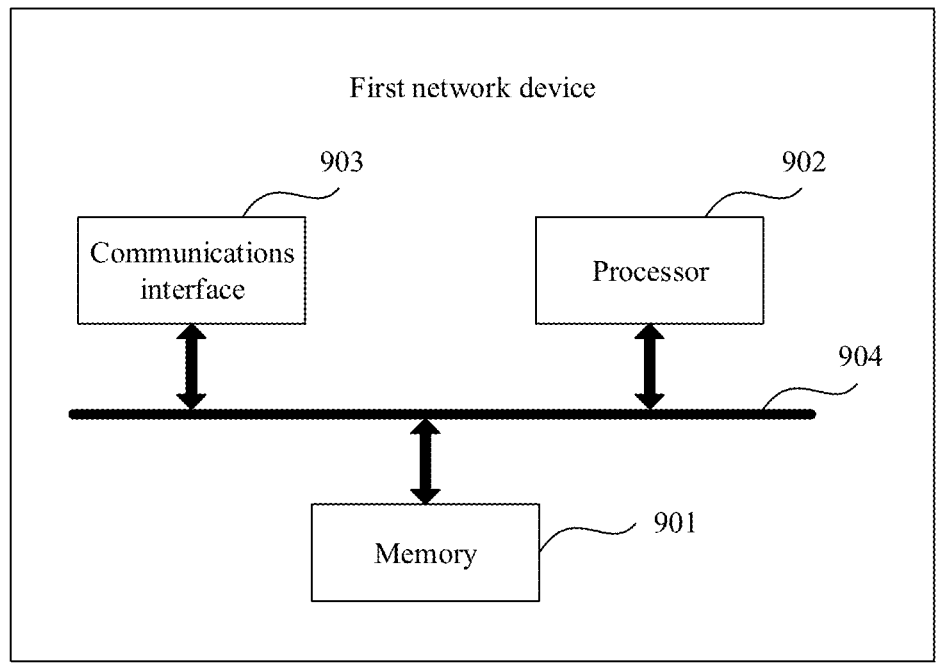
FIG. 9 is a possible schematic diagram of a logical structure of a first network device according to an embodiment of the present disclosure.

FIG. 9 is a possible schematic diagram of a logical structure of the first network device in the foregoing embodiments according to an embodiment of this application. The first network device includes a processor 902. In this embodiment of this application, the processor 902 is configured to control and manage an action of the first network device. For example, the processor 902 is configured to support the first network device in processing various messages and obtaining beam information in the receiving unit 803, the sending unit 801, and the processing unit 802 in the foregoing embodiment. Optionally, the first network device may further include a memory 901 and/or a communications interface 903. The processor 902, the communications interface 903, and the memory 901 may be connected to each other, or may be connected to each other by using a bus 904. The communications interface 903 is configured to support the first network device in performing communication, and the memory 901 is configured to store program code and data of the first network device. The processor 902 invokes the code stored in the memory 901 to perform control management. The memory 901 may be coupled to or not coupled to the processor.

The processor 902 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. The bus 904 may be a peripheral component interconnect (PCI) bus, an extended industry standard architecture (EISA) bus, or the like. The bus may be categorized as an address bus, a data bus, a control bus, and the like. For ease of representation, only one thick line is used to represent the bus in FIG. 9, but this does not mean that there is only one bus or only one type of bus.

The processor 902 and the memory 901 may also be integrated into an application-specific integrated circuit, and the integrated circuit may further include the communications interface 903. The application-specific integrated circuit may be a processing chip, or may be a processing circuit. The communications interface 903 may be a communications interface that includes wireless receiving and sending, or may be an interface of a digital signal that is input after a received radio signal is processed by another processing circuit, or may be a software or hardware interface that communicates with another module.

Figure 10:
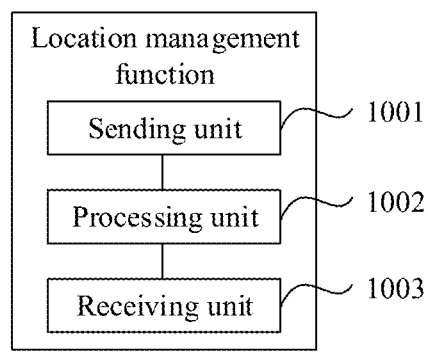
FIG. 10 is a possible schematic structural diagram of a location management device according to an embodiment of the present disclosure.

FIG. 10 is a possible schematic structural diagram of the location management device in the foregoing embodiments according to this application. In this application, the location management device may be a part of a base station, or may be an independent device connected to a network. The location management device includes a sending unit 1001 and a receiving unit 1003. The sending unit 1001 is configured to support the location management device in performing S201, S204, S207, S208, and S209 in FIG. 2, S301 in FIG. 3, S401 in FIG. 4, and S501 in FIG. 5. The receiving unit 1003 is configured to support the location management device in performing S202, S205, S207, S208, and S211 in FIG. 2, S303 in FIG. 3, S403 in FIG. 4, and S502 in FIG. 5.

The location management device may further include a processing unit 1002 configured to support the first network device in performing S206 in FIG. 2, performing S503 in FIG. 5, processing received and/or sent messages performed by the location management device in the foregoing method embodiments, and the like.

In terms of hardware implementation, the sending unit 1001 may be a transmitter, the receiving unit 1003 may be a receiver, and the receiver and the transmitter are integrated into a communications unit to form a communications interface.

Figure 11:
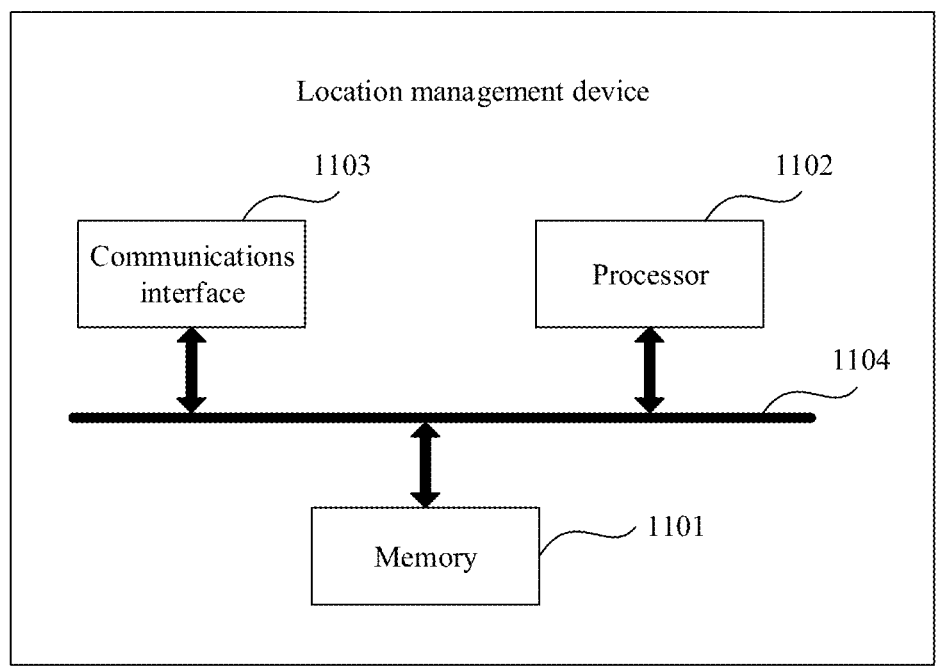
FIG. 11 is a possible schematic diagram of a logical structure of a location management device according to an embodiment of the present disclosure.

FIG. 11 is a possible schematic diagram of a logical structure of the location management device in the foregoing embodiments according to an embodiment of this application. The location management device includes a processor 1102. In this embodiment of this application, the processor 1102 is configured to control and manage an action of the location management device. For example, the processor 1102 is configured to support the location management device in processing various messages, performing base station selection, performing interference coordination, and the like in the receiving unit 1003, the sending unit 1001, and the processing unit 1002 in the foregoing embodiment. Optionally, the location management device may further include a memory 1101 and/or a communications interface 1103. The processor 1102, the communications interface 1103, and the memory 1101 may be connected to each other, or may be connected to each other by using a bus 1104. The communications interface 1103 is configured to support the location management device in performing communication, and the memory 1101 is configured to store program code and data of the location management device. The processor 1102 invokes the code stored in the memory 1101 to perform control management. The memory 1101 may be coupled to or not coupled to the processor.

The processor 1102 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. The bus 1104 may be a peripheral component interconnect (PCI) bus, an extended industry standard architecture (EISA) bus, or the like. The bus may be categorized as an address bus, a data bus, a control bus, and the like. For ease of representation, only one thick line is used to represent the bus in FIG. 11, but this does not mean that there is only one bus or only one type of bus.

The processor 1102 and the memory 1101 may also be integrated in an application-specific integrated circuit, and the integrated circuit may further include the communications interface 1103. The application-specific integrated circuit may be a processing chip, or may be a processing circuit. The communications interface 1103 may be a communications interface that includes wireless receiving and sending, or may be an interface of a digital signal that is input after a received radio signal is processed by another processing circuit, or may be a software or hardware interface that communicates with another module.

In another embodiment of this application, a non-transitory computer-readable storage medium is further provided. The non-transitory computer-readable storage medium stores computer-executable instructions. When executing steps of the terminal or the first network device in the positioning beam information obtaining method in FIG. 2, FIG. 3, FIG. 4, or FIG. 5, a device (which may be a single-chip microcomputer, a chip, or the like) or a processor reads the computer-executable instructions in the storage medium. The foregoing non-transitory computer-readable storage medium may include: any medium that can store program code, such as a USB flash drive, a removable hard disk, a read-only memory, a random access memory, a magnetic disk, or an optical disc.

In another embodiment of this application, a computer program product is further provided. The computer program product includes computer-executable instructions, and the computer-executable instructions are stored in a non-transitory computer-readable storage medium. At least one processor of a device may read the computer-executable instructions from the non-transitory computer-computer-readable storage medium, and the at least one processor executes the computer-executable instructions, so that the device performs steps of the terminal and the first network device in the positioning beam information obtaining method provided in FIG. 2 to FIG. 5.

In another embodiment of this application, a communications system is further provided. The communications system includes at least one terminal, one first network device, and one location management function. The first network device includes a base station, a neighboring base station, or a location management unit. The terminal may be the terminal provided in FIG. 6 or FIG. 7, and is configured to perform steps of the terminal in the beam information obtaining methods provided in FIG. 2 to FIG. 5, and/or the first network device may be the first network device provided in FIG. 8 or FIG. 9, and is configured to perform steps performed by the first network device in the positioning reference signal configuration methods provided in FIG. 2 to FIG. 5. It should be understood that the communications system may include a plurality of terminals and a plurality of first network devices. The terminal may simultaneously measure reference signals sent by the plurality of first network devices, and send beam information and/or a positioning measurement result to the location management function.

In this embodiment of this application, the terminal receives a beam information request sent by the location management function, and sends the beam information to the location management function, so that the location management function can configure a positioning reference signal based on the beam information that can be received by the terminal. In addition, the first network device receives a PRS configuration request sent by the location management function, and performs PRS configuration in a specified direction. According to the foregoing method, the positioning reference signal can be sent only in a limited direction, thereby reducing a resource waste caused by sending a PRS beam in each direction.

Finally, it should be noted that the foregoing descriptions are merely specific implementations of this application, but the protection scope of this application is not limited thereto. Any variation or replacement within the technical scope disclosed in this application shall fall within the protection scope of this application. Therefore, the protection scope of this application shall be subject to the protection scope of the claims.

What is claimed is:

1. A positioning beam information obtaining method, comprising:
   receiving, by a terminal, a beam information request sent by a location management device, wherein the beam information request requests the terminal to provide measurement information of a downlink beam;
   obtaining, by the terminal, beam information, wherein the beam information comprises information about a reference signal that is sent by at least one network device and that is measured by the terminal;
   sending, by the terminal, the obtained beam information to the location management device;
   receiving, by the terminal, an assistance data providing message sent by the location management device, wherein the assistance data providing message comprises assistance data comprising at least one of a beam type, a beam number, or a quasi-colocation (QCL) indication; and
   determining, by the terminal based on the assistance data, a direction of a beam for receiving a positioning reference signal.

2. The method according to claim 1, wherein the beam information request comprises at least one of: an identifier of a target transmission point, frequency band information, bandwidth information, or a waveform parameter.

3. The method according to claim 2, further comprising:
sending, by the terminal, a measurement request to a serving base station, to request to measure the reference signal sent by the at least one network device, wherein
the measurement request comprises at least one of: the identifier of the target transmission point, the frequency band information, the bandwidth information, the waveform parameter, or a measurement type indication, and
the measurement type indication indicates to the serving base station to configure beam information measurement for the terminal.

4. The method according to claim 3, further comprising:
receiving, by the terminal, a measurement configuration sent by the serving base station, wherein the measurement configuration comprises information about a measurement object; and
performing, by the terminal, measurement based on the measurement configuration.

5. The method according to claim 1, wherein
the assistance data comprises the beam type.

6. The method according to claim 1, wherein
the assistance data comprises the beam number.

7. The method according to claim 1, wherein
the assistance data comprises the quasi-colocation (QCL) indication.

8. A positioning reference signal configuration method in a wireless positioning system, the method comprising:
receiving, by a network device, a positioning reference signal configuration request sent by a location management device, wherein the positioning reference signal configuration request comprises beam information of a terminal; and
sending, by the network device, a positioning reference signal configuration response to the location management device, wherein the positioning reference signal configuration response comprises configuration information of a positioning reference signal to be sent to the terminal,
wherein the method further comprises:
(i) determining, by the network device, a configuration of the positioning reference signal based on the beam information, and sending, by the network device, the configuration of the positioning reference signal to the location management device; or
(ii) receiving, by the network device, a positioning reference signal configuration coordination result sent by the location management device, wherein the positioning reference signal configuration coordination result comprises a configuration of the positioning reference signal determined after interference coordination.

9. The method according to claim 8, further comprising:
receiving, by the network device, a beam information request sent by the location management device, wherein the beam information request requests measurement information of a downlink beam of the terminal, and the beam information request comprises an identifier of a target transmission point; and
obtaining, by the network device, the beam information of the terminal.

10. The method according to claim 9, further comprising:
sending, by the network device, a beam information report to the location management device, wherein
the beam information report comprises at least one of: an identifier of the terminal, the identifier of the target transmission point, a beam type of the target transmission point, a beam change, or a reference signal received power (RSRP) value of a beam.

11. The method according to claim 9, wherein the obtaining, by the network device, the beam information of the terminal comprises:
determining, by the network device, the beam information of the terminal based on a historical measurement result reported by the terminal; or
performing, by the network device, measurement configuration for the terminal, receiving, by the network device, a measurement report sent by the terminal based on the measurement configuration, and determining, by the network device, the beam information of the terminal based on the measurement report.

12. The method according to claim 8, wherein the configuration of the positioning reference signal determined by the network device comprises a frequency domain position, a time domain position, and a sending direction.

13. A terminal, comprising:
a receiver configured to receive a beam information request sent by a location management device, wherein the beam information request requests the terminal to provide measurement information of a downlink beam;
a processor configured to obtain beam information, wherein the beam information comprises information about a reference signal that is sent by at least one network device and that is measured by the terminal; and
a transmitter configured to send the obtained beam information to the location management device, wherein
the transmitter is further configured to send a measurement request to a serving base station, to request to measure the reference signal sent by the at least one network device,
the measurement request comprises at least one of: an identifier of a target transmission point, frequency band information, bandwidth information, a waveform parameter, or a measurement type indication, and
the measurement type indication indicates to the serving base station to configure beam information measurement for the terminal.

14. The terminal according to claim 13, wherein the beam information request comprises at least one of: the identifier of the target transmission point, the frequency band information, the bandwidth information, or the waveform parameter.

15. The terminal according to claim 13, wherein
the receiver is further configured to receive a measurement configuration sent by the serving base station, wherein the measurement configuration comprises information about a measurement object; and
the processor is further configured to perform measurement based on the measurement configuration.

16. The terminal according to claim 13, wherein
the receiver is further configured to receive an assistance data providing message sent by the location management device, wherein the assistance data providing message comprises assistance data comprising at least one of a beam type, a beam number, or a quasi-colocation (QCL) indication; and the processor is further configured to determine, based on the assistance data, a direction of a beam for receiving a positioning reference signal.

17. A network device, comprising:
a receiver configured to receive a positioning reference signal configuration request sent by a location management device, wherein the positioning reference signal configuration request comprises beam information of a terminal;
a transmitter configured to send a positioning reference signal configuration response to the location management device, wherein the positioning reference signal configuration response comprises configuration information of a positioning reference signal to be sent to the terminal; and
a processor configured to:
determine the beam information of the terminal based on a historical measurement result reported by the terminal; or
perform measurement configuration for the terminal, and determine the beam information of the terminal based on a measurement report sent by the terminal, wherein the receiver is configured to receive the measurement report sent by the terminal based on the measurement configuration.

18. The network device according to claim 17, wherein the receiver is further configured to receive a beam information request sent by the location management device, wherein the beam information request requests measurement information of a downlink beam of the terminal, and the beam information request comprises an identifier of a target transmission point.

19. The network device according to claim 18, wherein
the transmitter is further configured to send a beam information report to the location management device, wherein
the beam information report comprises at least one of: an identifier of the terminal, the identifier of the target transmission point, a beam type of the target transmission point, a beam change, or a reference signal received power (RSRP) value of a beam.

* * * * *